United States Patent [19]

Opdahl

[11] Patent Number: 5,239,765
[45] Date of Patent: Aug. 31, 1993

[54] ADVERTISING DISPLAY

[76] Inventor: Everett W. Opdahl, 4407 Long Green Rd., Long Green, Md. 21092

[21] Appl. No.: 649,669

[22] Filed: Feb. 1, 1991

[51] Int. Cl.$^5$ .......................................... G09F 17/00
[52] U.S. Cl. .................................... 40/603; 40/590; 160/392
[58] Field of Search ............ 40/603; 38/102.1, 102.91; 160/378, 392, 395, 368.1

[56] References Cited

U.S. PATENT DOCUMENTS

| | | | |
|---|---|---|---|
| 738,443 | 9/1903 | Henshaw | 40/152 |
| 1,880,099 | 9/1932 | Marsh | 40/156 |
| 2,193,928 | 3/1940 | Johnson | 40/603 |
| 2,212,313 | 8/1940 | Avenson | 40/603 |
| 3,182,413 | 5/1965 | Karoly | 40/642 |
| 3,805,873 | 4/1974 | Bloomfield | 160/392 |
| 4,053,008 | 10/1977 | Baslow | 160/392 |
| 4,539,734 | 9/1985 | Messerschmitt | 38/102.91 |
| 4,580,361 | 4/1986 | Hillstrom et al. | 40/603 |
| 4,756,107 | 7/1988 | Hillstrom | 40/603 |
| 4,773,174 | 9/1988 | Boeniger et al. | 40/156 |
| 5,039,246 | 8/1991 | Woodruff et al. | 160/392 |
| 5,058,299 | 10/1991 | Suzuki | 40/603 |

Primary Examiner—James R. Brittain
Assistant Examiner—Cassandra Hope
Attorney, Agent, or Firm—Leonard Bloom

[57] ABSTRACT

A low-profile, light-weight advertising display is provided for exhibiting advertisements on trucks, billboards and the like. The advertising display is provided with a self-tensioned display panel which resists sagging and wrinkling by virtue of its own elasticity, and a display panel mounting which allows convenient installation and removal.

6 Claims, 8 Drawing Sheets

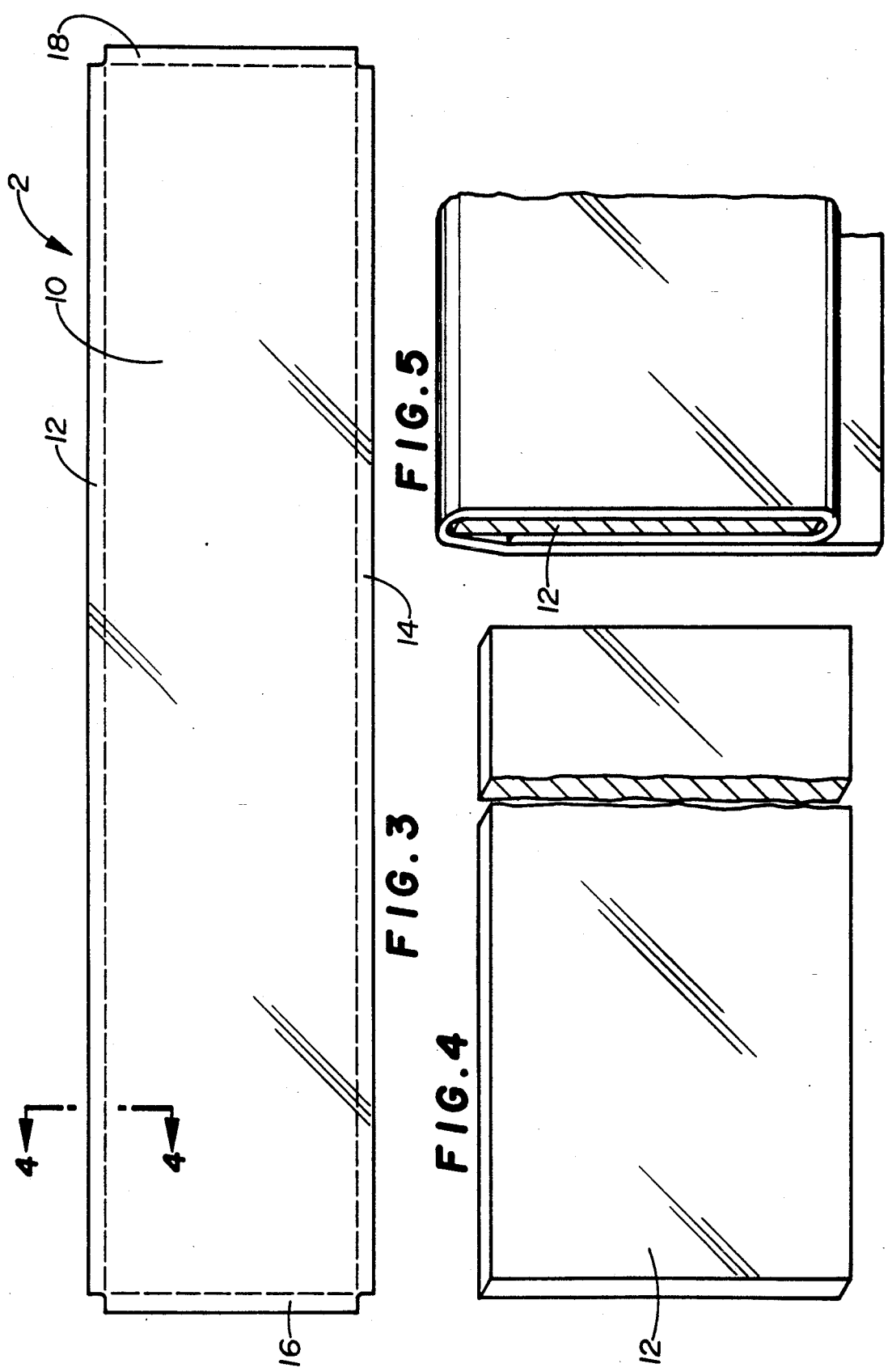

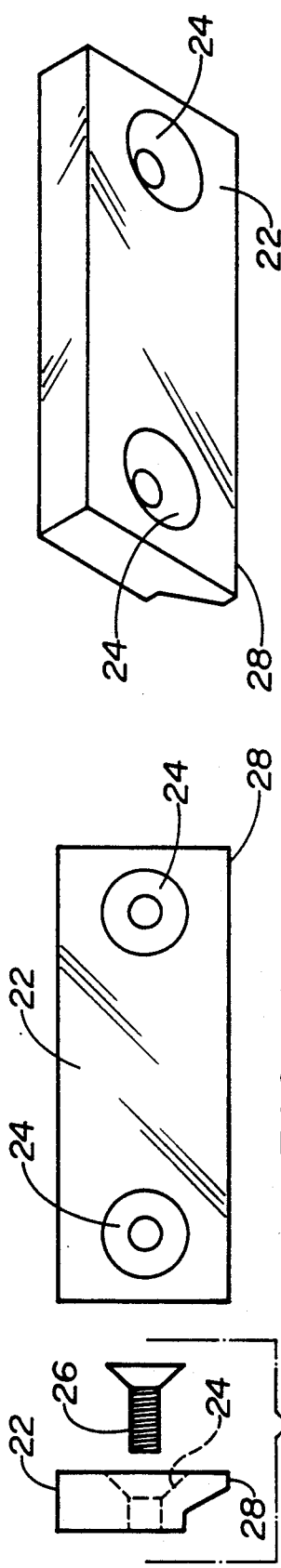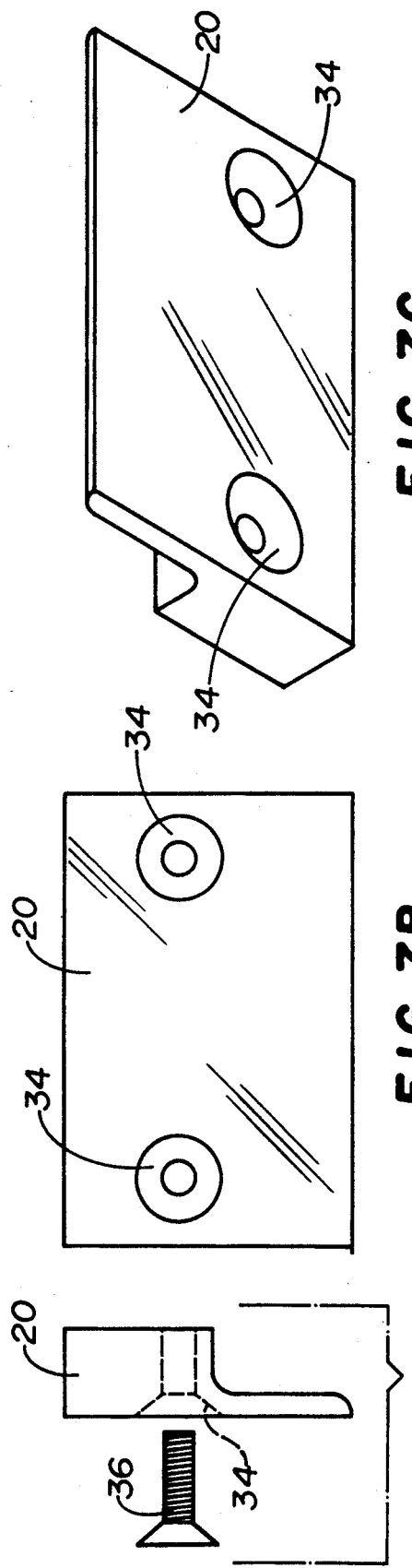

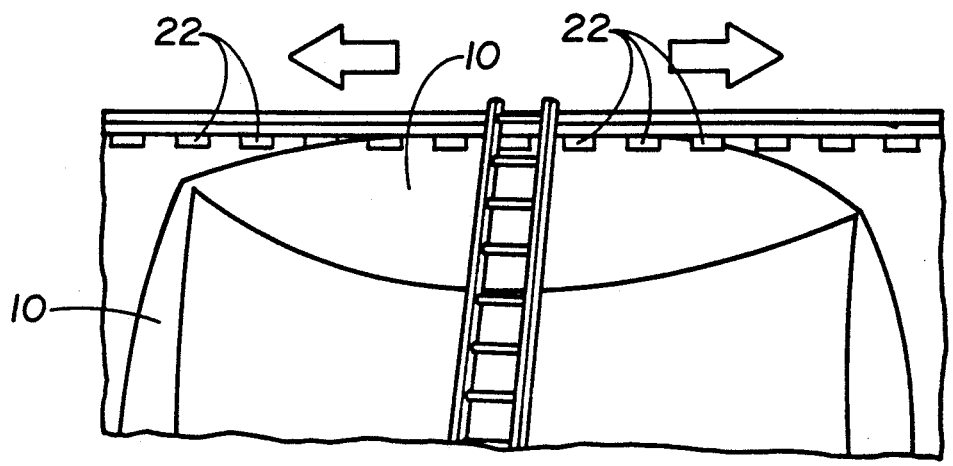
FIG. 14
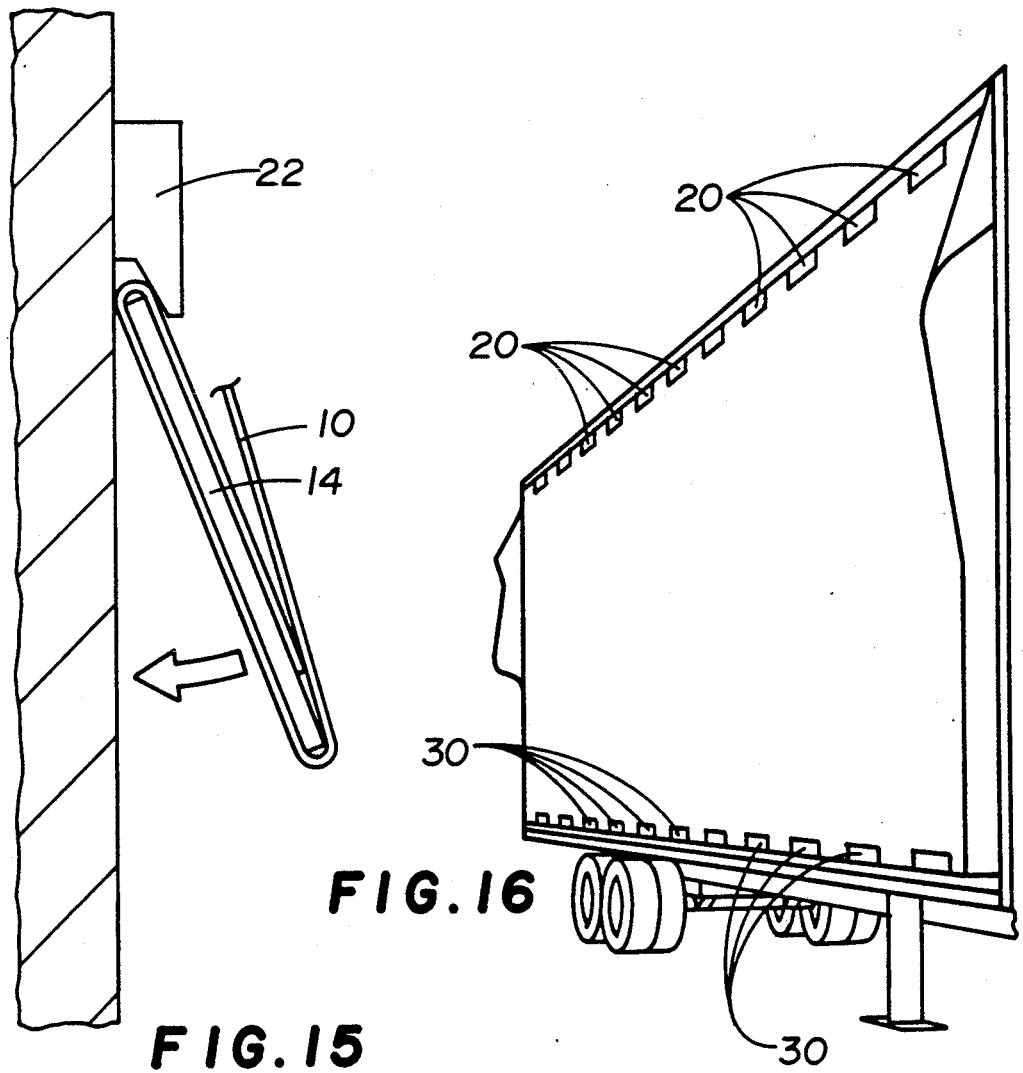
FIG. 15
FIG. 16

ADVERTISING DISPLAY

BACKGROUND OF THE INVENTION

1. Field of the invention

The present invention relates to advertising displays and, more particularly, to a self-tensioning display panel and mounting system for exhibiting advertisements on trucks, billboards and the like.

2. Description of the Background

Numerous varieties of sign and poster displays are currently used to exhibit advertisements on billboards, buildings, the sides of vehicles, etc. These displays typically exhibit their advertisement on a display panel made of large canvas or plastic sheets secured to flat surface by a mounting. Smaller display panels are often mounted within enclosures to protect the display panel from the elements. However, such enclosures are prohibitively cumbersome for larger display panels, and these typically remain exposed. Over time, the exposed display panel tends to wrinkle and tear until the advertisement becomes unattractive, unappealing, and ultimately unintelligible.

Nevertheless, there is a great demand for large advertising displays of the type used on billboards, the sides of tractor trailers, and other generally flat surfaces. Consequently, a number of improved displays have been proposed which are more resistant to wind and weather. For example, U.S. Pat. No. 4,580,361 illustrates a display tensioning frame for tautly retaining a large display panel. The tension applied to the sign keeps it taut despite the elements, and when mounted on a vehicle, despite the speed of the vehicle. Since the display panel can be easily mounted within the frame, the process of installing or replacing advertisements is simpler and more economical. However, the patent explains that the display panel should be formed of a non-resilient material such as polystyrene in order to further resist wrinkling and fluttering. This limitation results in an unmanageable display panel. In addition, strict state regulations govern the dimensions of trucks, and it is possible that the device shown in U.S. Pat. No. 4,580,361 may interfere with such dimensions because the requisite mounting protrudes significantly from the truck. Moreover, these mountings are complex. They require intricate components which are prone to failure from rust and dirt, and the components are expensive to manufacture. Still further, the edges of the display panel are held by the mounting at eyelets located around the periphery. Each eyelet imparts a highly localized stress which results in non-uniform tensioning of the display panel.

Other proposed display tensioning frames have resulted in these and other problems.

It would be greatly advantageous if the display panel were flexible to allow rolling-up for more convenient transportation. Maintenance costs could be reduced dramatically if the display panel could be removed to a remote location for more convenient application of an advertisement.

Summary of the Invention

It is, therefore, an object of the present invention to provide a low-profile and light-weight advertising display having a tensioned display panel.

It is another object of the invention to provide an elastic display panel which can be rolled-up for convenient transportation, and which resists sagging and wrinkling by virtue of its own elasticity.

It is another object of the invention to provide a mounting in which a display panel can be conveniently installed or removed.

It is another object of the invention to provide an advertising display adaptable for use on a trucks and other vehicles having a variety of side-wall surfaces, billboards, buildings and the like.

It is a further object of the invention to provide a uniformly tensioned display panel, whereupon the tension can be easily varied.

According to the present invention, the above-described and other objects are accomplished by providing an advertising display in which a first edge of a flat elongate first stay is attached lengthwise across a first edge of said display panel, a first edge of a flat elongate second stay is attached lengthwise across an opposing second edge of said display panel, the first stay being anchored on a supporting structure, and the second stay being anchored on the supporting structure by pivotally seating the second edge of the second stay in an inner catch provided on the supporting structure, pivoting the second stay about the second edge whereby the first edge imparts a tension to the elastic display panel, and securing the first edge of the second stay against the supporting structure with a retainer fastened to the supporting structure.

BRIEF DESCRIPTION OF THE DRAWINGS

Other objects, features and advantages of the present invention will become more apparent from the following detailed description of preferred embodiments and certain modifications thereof when taken together with the accompanying drawings, in which:

FIG. 3 is a detailed assembly diagram of the display panel 10 of FIG. 1.

FIG. 4 is a cross-sectional view of stay 12 of FIG. 3.

FIG. 5 shows attachment of display panel 10 to stay 12.

FIGS. 6A-C illustrate a side view, top view and perspective view, respectively, of an inside retainer 22.

FIGS. 7A-7C illustrate a side view, top view and perspective view, respectively, of a top outside retainer 20.

FIGS. 10-18 sequentially illustrate a method for mounting the display assembly.

DETAILED DESCRIPTION OF THE PREFERRED EMBODIMENTS

Figure 1:
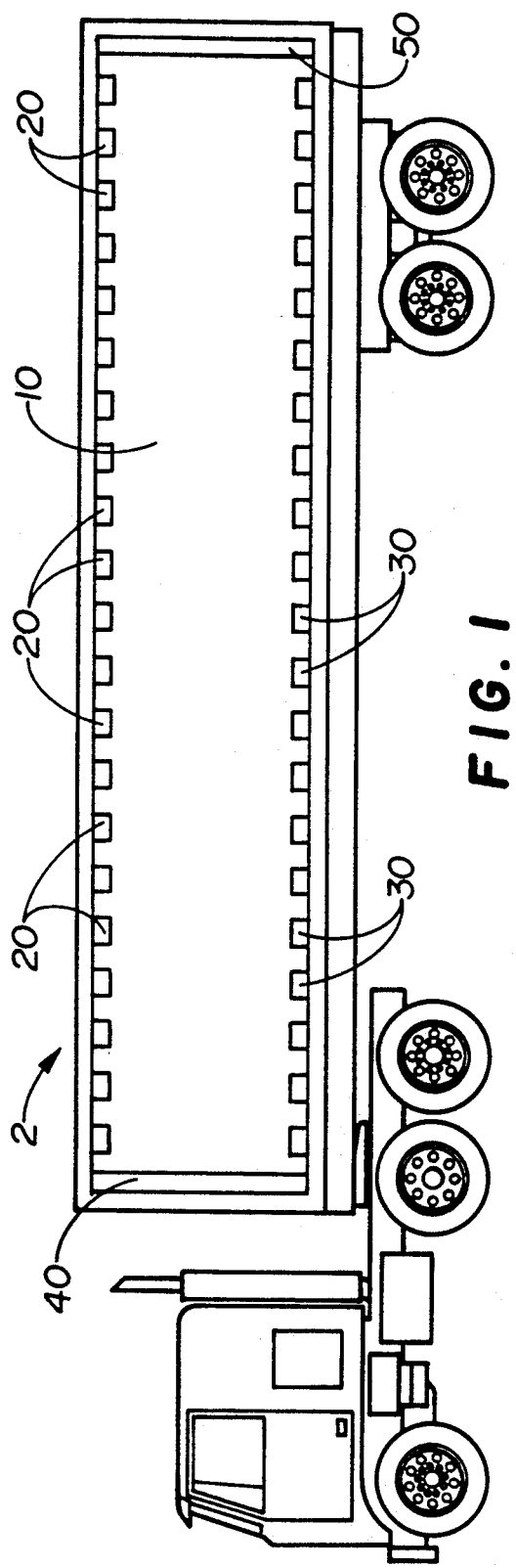
FIG. 1 is a side view of an advertising display according to the present the display being mounted on a tractor trailer.

FIG. 1 illustrates a side view of an advertising display 2 according to the present invention which has been installed on the side of a tractor trailer.

Advertising display 2 further comprises display panel 10, a plurality of top outside retainers 20, a plurality of bottom outside retainers 30, a forward edge cover 40, and an aft edge cover 50. A plurality of inside retainers are also provided (not visible from this view).

The advertising display may be alternately sized and mounted on any generally flat surface including a variety of trucks, billboards, buildings and the like. For instance, the side-walls of trucks may be corrugated, or may be provided with exterior reinforcing ribs. The advertising display of the present invention can be mounted these and other surfaces because the display panel 10 is tautly suspended above the surface.

Figure 2:
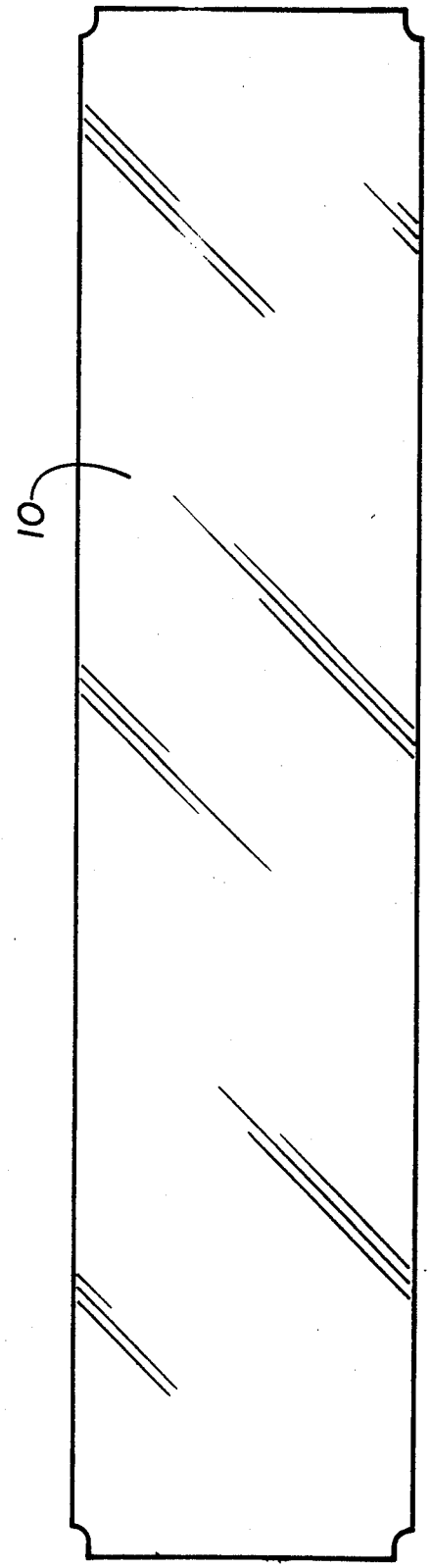
FIG. 2 illustrates the pattern of material required for the display panel of FIG. 1.

FIG. 2 illustrates the pattern of material for display panel 10 sized in relative proportions to fit the tractor trailer of FIG. 1. The material for display panel 10 is preferably constructed of a strong, lightweight, reinforced plastic having a degree of elasticity. The material is sized to conform to the display area, and notches are cut into each of the four corners to allow folding of the material along each margin.

FIG. 3 is a detailed assembly diagram of the display panel 10 of FIG. 1. Display panel 10 comprises an elongate top stay 12, an elongate bottom stay 14, left stay 16 and right stay 18, all secured to the margins of the material.

FIG. 4 is a cross-sectional view of stay 12 which is representative of stays 14, 16 and 18 as well. The stays 12, 14, 16 and 18 are preferably formed of aluminum, fiberglass, wood or other lightweight and sturdy material. Each stay 12, 14, 16 and 18 spans an entire side of display panel 10, the four stays allowing creation of a framework for supporting the display panel material.

FIG. 5 is a cross-section of the stay 12 of FIG. 4, illustrating the manner in which all of stays 12, 14, 16 and 18 are attached lengthwise along the margins of the display panel material, and are enveloped therein for additional durability. The material is secured to stay 12 by adhesive, stitching, or other conventional means.

FIGS. 6A-C illustrate a side view, top view and perspective view, respectively, of an inside retainer 22. A plurality of top and bottom inside retainers 22 are provided along the top and bottom of the display area. The top and bottom inside retainers 22 are equidistantly spaced, and are fastened in parallel rows along the top and bottom of the display surface by means of screws 26 threaded through tapered bore holes 24. The top and bottom inside retainers 22 are positioned opposite top and bottom stays 12 and 14 on display panel 10. In addition, left and right inside retainers 22 are provided along the left and right sides of the display surface. The left and right inside retainers 22 are constructed in accordance with FIGS. 6A-C, but are elongated to extend the entire height of the display panel 10.

Each inside retainer 22 is provided with a lip 28 running lengthwise along a side. Lip 28 acts as a pivotal seating for stays 12 or 14.

FIGS. 7A-7C illustrate a side view, top view and perspective view, respectively, of an outside retainer 20. A plurality of top outside retainers 20 and bottom outside retainers 30 are provided, each one positioned opposite a corresponding top or bottom inside retainer 22.

Figure 8:
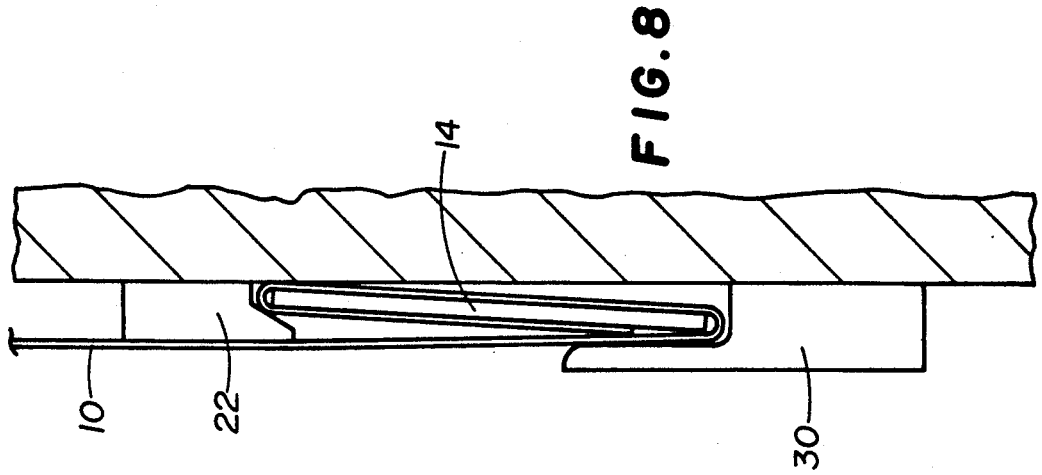
FIG. 8 illustrates a cross-section of a bottom outside retainer 30 and opposing bottom inside retainer 22 with bottom stay 14 secured therebetween.

FIG. 8 illustrates a cross-section of bottom outside retainer 30 and opposing bottom inside retainer 22 with bottom stay 14 secured therebetween.

Figure 9:
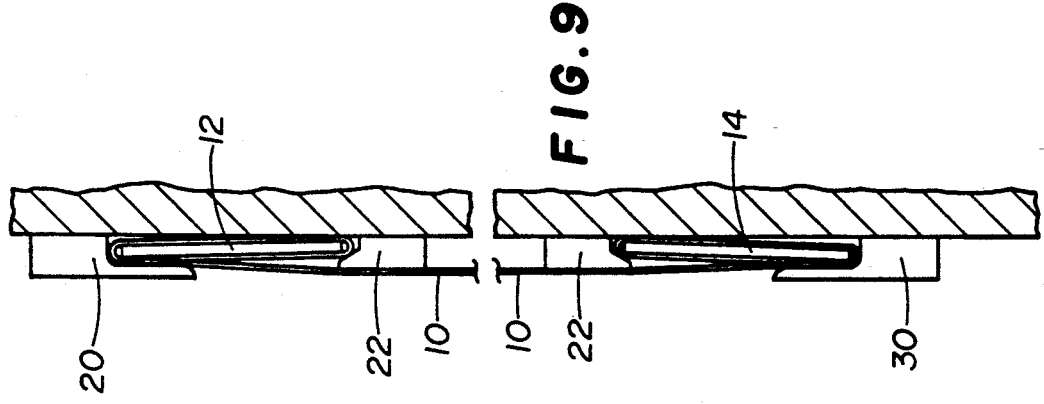
FIG. 9 a cross-section of display panel 10 tensioned across the display surface.

As shown in FIG. 9, when the top stay 12 is secured within top inside retainers 22 and opposing top outside retainers 20, and bottom stay 14 is secured within bottom inside retainers 22 and opposing bottom outside retainers 30, the display 10 remains uniformly tensioned across the display surface.

FIGS. 10-18 sequentially illustrate a preferred method for mounting the display assembly.

Figure 10:
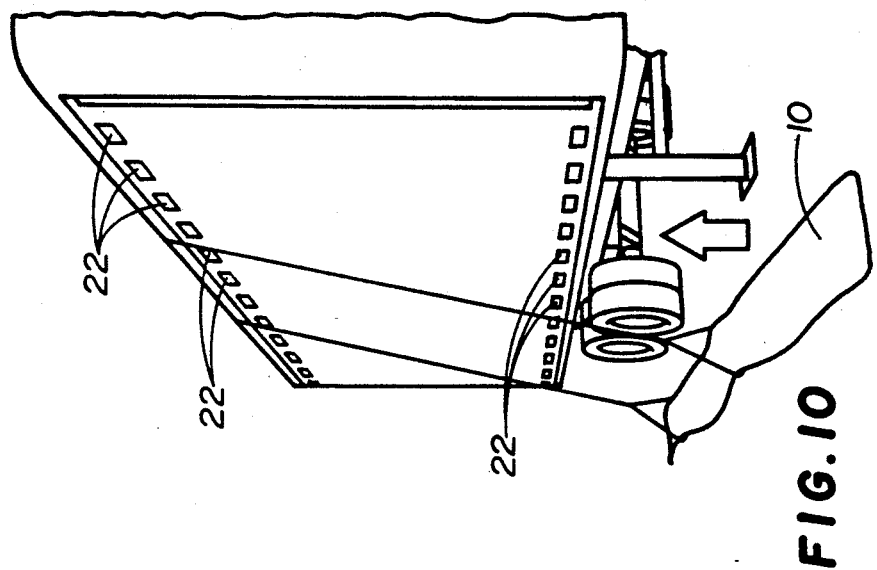

As shown in FIG. 10, top, bottom, front and aft inside retainers 22 are installed along the edges of the display surface with lips 28 extending towards the periphery of the display surface.

Figure 11:
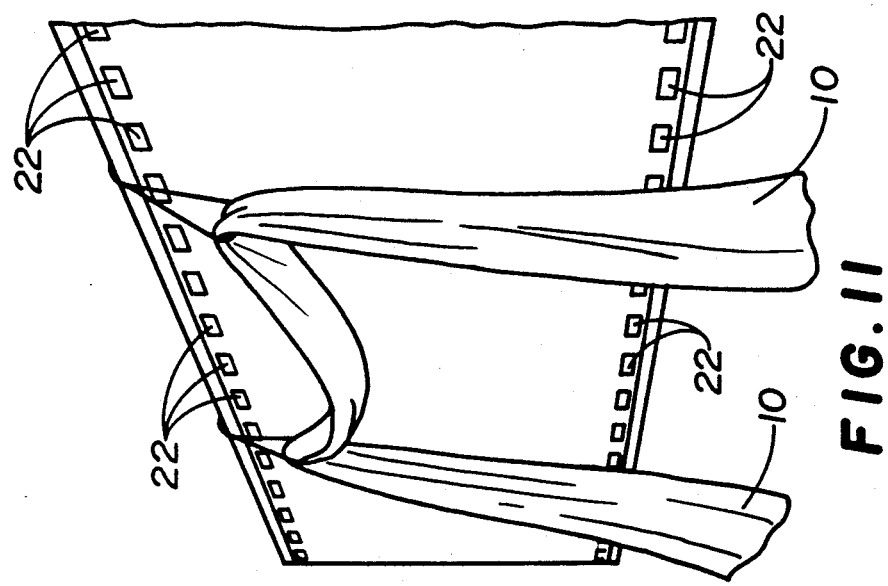

As shown in FIG. 11, the display panel 10 is hoisted to the top of the display surface.

Figure 13:
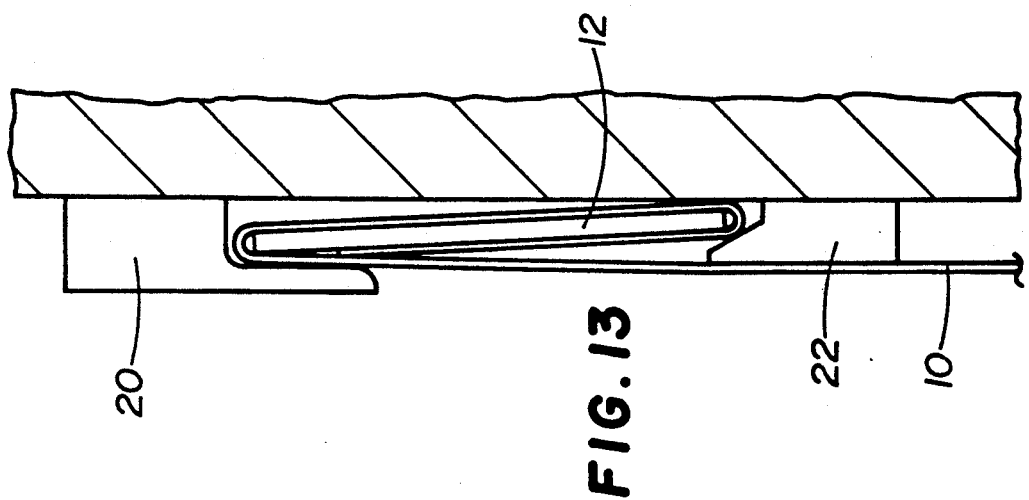
Figure 12:
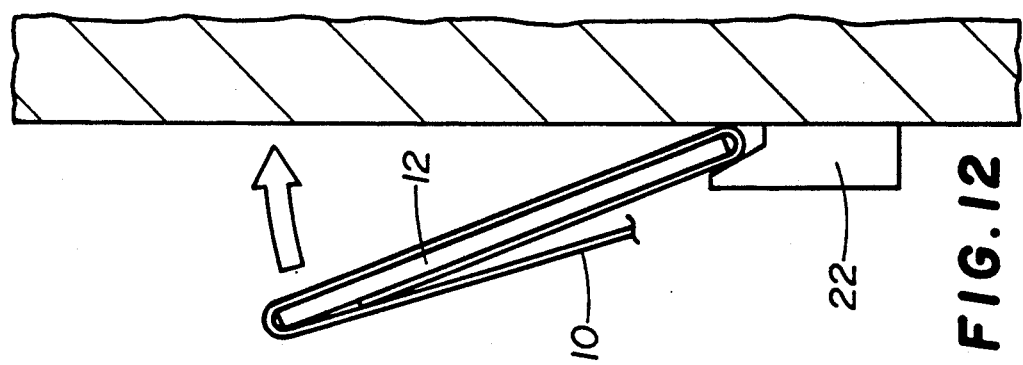

As shown in FIG. 12, the top stay 12 is seated in a centrally located top inside retainer 22, and stay 12 is then held flat against the side of the display surface while a corresponding outside retainer 20 is installed, the result being described in FIG. 13.

Working outward from the center, the top stay 12 is mounted between the other pairs of top inside and outside retainers 20 and 22 in the same manner described above. At this point the display panel is completely suspended from its top edge.

As shown in FIG. 15, the bottom stay 14 is seated within a centrally located bottom inside retainer 22. The bottom stay 14 is then cantilevered into a flat position facing the display surface. As bottom stay 14 is pivoted within bottom inside retainer 22, increasing tension is imparted on display panel 10 pulling it tight across the display surface.

Working outward from the center, bottom stay 14 is mounted between the other pairs of bottom inside and outside retainers 22 and 30 in the same manner described above. At this point the display panel is tautly suspended across the entire display surface.

Figure 17:
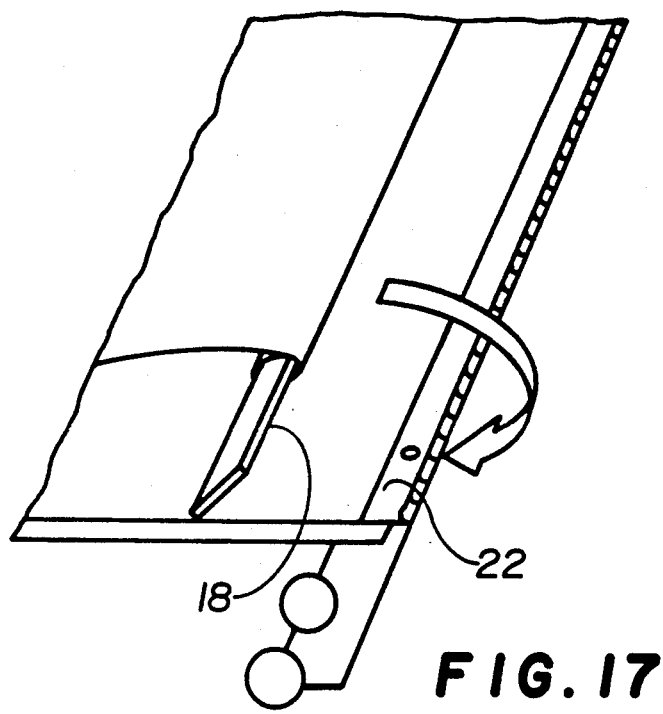

Right stay 18 is then seated within the right inside retainer 22, as shown in FIG. 17, and is cantilevered flat against the display surface.

Figure 18:
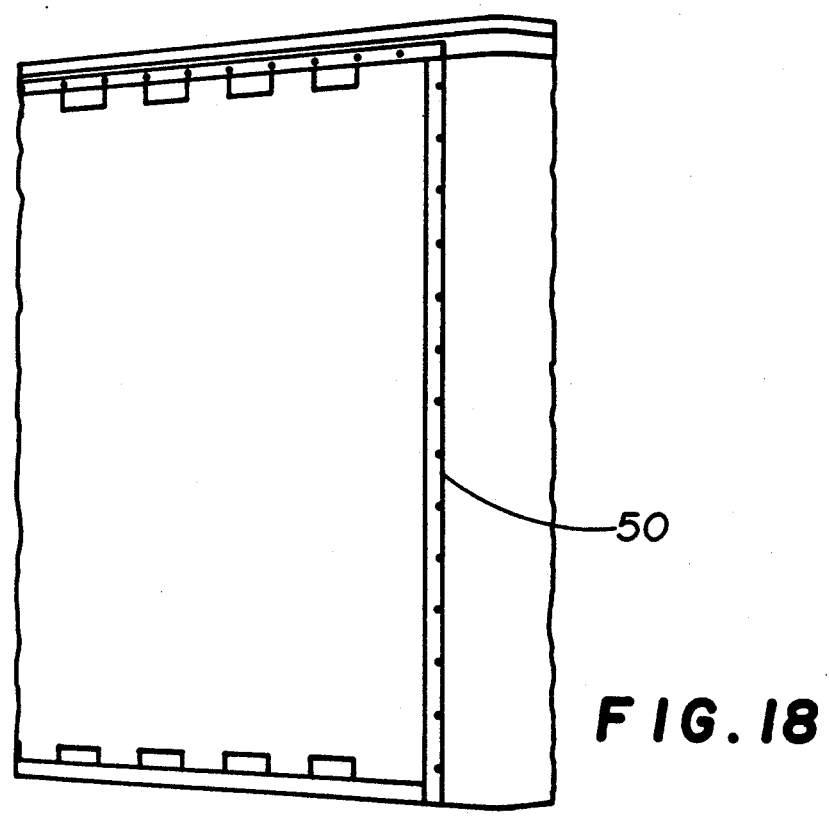

As shown in FIG. 18, the edges of right stay 18 are secured against the display surface by a aft edge cover 50. The same process is repeated on the left side of the display panel 10 with left stay 16 and front edge cover 40 (shown in FIG. 1).

The net result is a uniform horizontal tension imparted to display panel 10, coupled with a uniform vertical tension. Because the stays 12, 14, 16 and 18 span each respective edge of the display panel, the resulting horizontal and vertical tension is uniform across the entire surface. Hence, the invention solves the problem of wrinkles caused by localized stress on the eyelets of prior art display panels, and the advertisement itself seems more appealing.

The amount of tension imparted to display panel 10 must be carefully maintained. On one hand, the tension must not be excessive or the material will tear. On the other hand, the tension must be sufficient to avoid rippling caused by air flow across a flaccid display panel surface. The present invention allows for convenient adjustment of the tension to loosen or tighten the display panel 10. The width of each stay 12, 14, 16 and 18, the angle of rotation where tensioning begins, and the dimensions and elasticity of the display panel material are variables affecting the final tension. Hence, in order to adjust the surface tension of the display panel any one of the following steps may be taken:

changing the width of the stays to alter the radius of rotation around the retainers.

altering the dimensions of the display panel material pattern.

altering the distance between opposing retainers 22.

incorporating more or less elasticity in the display panel material.

The above-described method of installation is quick and convenient, and the display panel can be quickly removed and conveniently transported for remote application of an advertisement.

Figure 19:
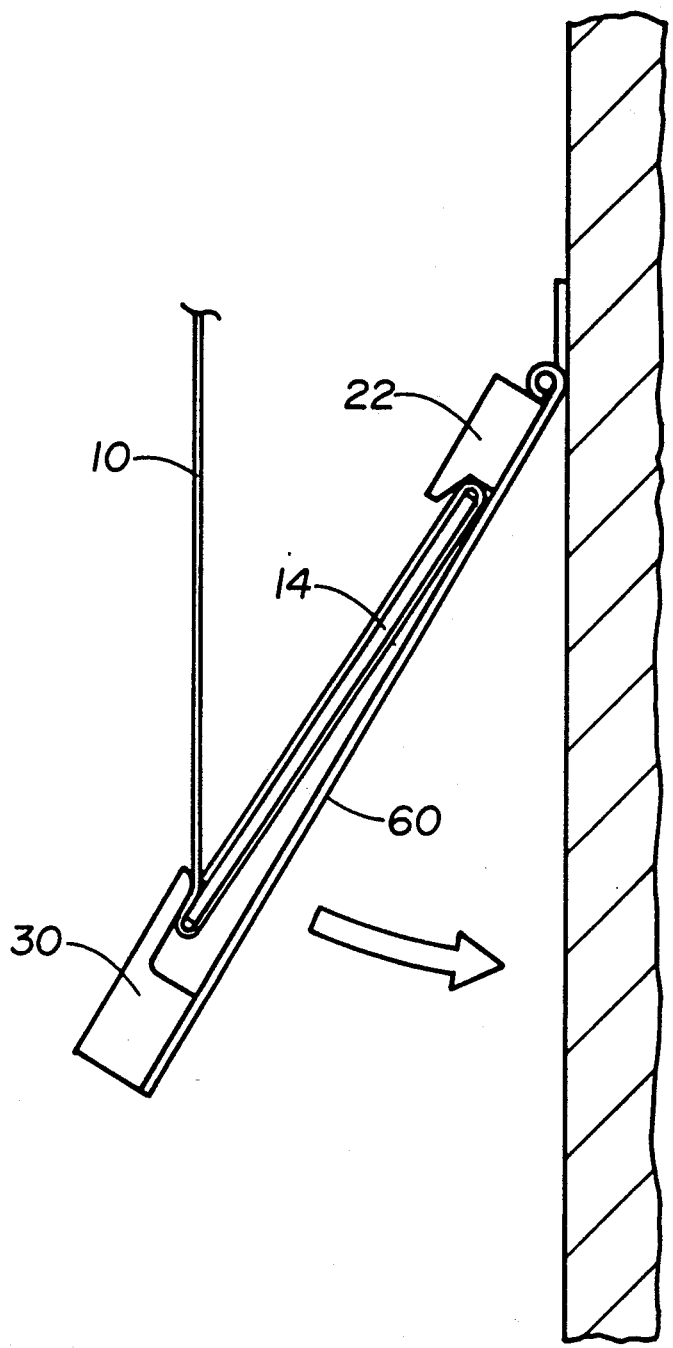
FIGS. 19 and 20 are side views of an alternative embodiment of the invention wherein inside retainer 22 and outside retainer 30 are mounted on a hinge 60.
Figure 20:
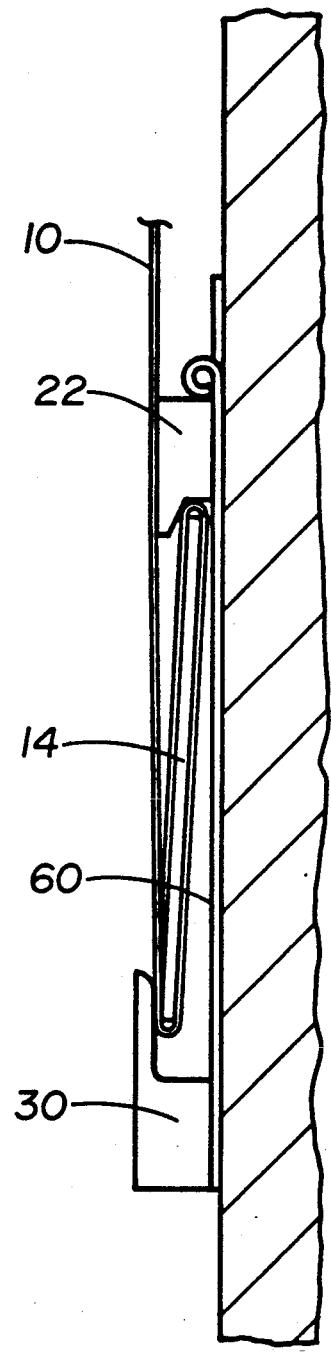

FIGS. 19 and 20 illustrate an alternative embodiment of the invention in which bottom inside retainers 22 and opposing bottom outside retainers 30 are mounted on a hinge 60 for more convenient tensioning of display panel 10. Hinge 60 is in turn mounted on the display surface. Likewise, top inside retainers 22 and opposing top outside retainers 20 may be mounted on an identical hinge. In operation, one end of hinge 60 is attached to the display surface by a screw or other conventional means. Stay 14 is then mounted within opposing bottom inside retainers 22 and opposing bottom outside retainers 30. The other end of hinge 60 is then pivoted against the display surface, and panel 10 is thereby tensioned. Finally, the end of hinge 60 is attached to the display surface.

Having now fully set forth the preferred embodiments and certain modifications of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. An advertising display, comprising:

an elastic display panel having at least two opposing edges;

a plurality of stays each for supporting one of said edges of the display panel, each stay further comprising a flat elongate support member to which one of said edges of said display panel is attached lengthwise; and mounting means for mounting said display panel on a supporting structure having a top and a bottom, said mounting means including a plurality of anchors attached across the top and bottom of said supporting structure for anchoring said stays thereto, said anchors each further comprising a discrete inside catch and outside catch for holding one of said stays captive therebetween;

whereby said display panel is tautly suspended over a surface of said supporting structure by successively inserting each stay anchor-by-anchor within said anchors until the edges of the display panel are suspended between a framework of anchors.

2. The advertising display according to claim 1, wherein said supporting structure is a billboard.

3. The advertising display according to claim 1, wherein said supporting structure is a side of truck.

4. The advertising display according to claim 3, wherein said truck is a tractor trailer.

5. The advertising display according to claim 1, wherein each stay further comprises a flat elongate support member having a first edge and a second edge, each edge of said display panel being attached lengthwise along one of said stays contiguously with the first edge said display panel being sized to be stretched between opposing anchors at the top and bottom of said supporting structure by seating the second edge of one of said stays in said inside catch of one of said anchors, pivoting the first edge of said stay about said second edge to impart a tension to said elastic display panel, and securing said first edge of the stay in the outside catch of the anchor.

6. The advertising display according to claim 5, wherein said at least one inside catch further comprises an elongate bracket having a recessed outside edge for pivotally seating said second edge of said stay.

* * * * *